United States Patent
Allen et al.

(10) Patent No.: US 10,089,293 B2
(45) Date of Patent: Oct. 2, 2018

(54) QR CODE LOADING OF FORM ELEMENTS

(71) Applicant: INTERNATIONAL BUSINESS MACHINES CORPORATION, Armonk, NY (US)

(72) Inventors: Corville O. Allen, Morrisville, NC (US); Madison E. Cantrell, Raleigh, NC (US); Michael C. Gouveia, Raleigh, NC (US); Anandakrishnan Narayanan, Morrisville, NC (US); Roman Ruiz-Esparza, Cary, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 26 days.

(21) Appl. No.: 15/289,511

(22) Filed: Oct. 10, 2016

(65) Prior Publication Data

US 2018/0101511 A1    Apr. 12, 2018

(51) Int. Cl.
*G06F 17/00* (2006.01)
*G06F 17/24* (2006.01)
*G06K 19/06* (2006.01)
*G06K 7/14* (2006.01)
*G06F 17/30* (2006.01)

(52) U.S. Cl.
CPC .......... *G06F 17/243* (2013.01); *G06F 17/248* (2013.01); *G06F 17/30879* (2013.01); *G06K 7/1417* (2013.01); *G06K 19/06037* (2013.01)

(58) Field of Classification Search
CPC .................. G06F 17/243; G06F 17/248; G06F 17/30879; G06K 19/06037
USPC ............. 235/375, 462.01; 715/224, 225, 226
See application file for complete search history.

(56) References Cited

U.S. PATENT DOCUMENTS

| | | | | |
|---|---|---|---|---|
| 6,651,217 | B1* | 11/2003 | Kennedy | G06F 17/243 715/224 |
| 2005/0224571 | A1* | 10/2005 | Kelley | G06F 17/243 235/375 |
| 2010/0182631 | A1* | 7/2010 | King | G06F 17/243 358/1.15 |
| 2011/0271173 | A1* | 11/2011 | Ait-Mokhtar | G06F 17/243 715/226 |
| 2012/0284602 | A1* | 11/2012 | Seed | G06Q 20/3274 715/224 |
| 2013/0126601 | A1 | 5/2013 | Lee | |
| 2013/0262241 | A1 | 10/2013 | Nelson | |
| 2014/0201102 | A1* | 7/2014 | Srinivasan | G06Q 10/00 705/342 |

(Continued)

FOREIGN PATENT DOCUMENTS

CN    103544136 A  *  1/2014

OTHER PUBLICATIONS

Anonymous, "Filtering mask to encrypt QR code," An IP.com Prior Art Database Technical Disclosure, IP.com No. IPCOM000233898D, Dec. 27, 2013 (4 pages).

(Continued)

*Primary Examiner* — Laura Gudorf
(74) *Attorney, Agent, or Firm* — Griffiths & Seaton PLLC

(57) ABSTRACT

Embodiments for facilitating form entry by one or more processors. The form is initialized by recognizing template data using a Quick Response (QR) code scanned by a user device. The form is populated using user data obtained from the user device.

18 Claims, 6 Drawing Sheets

(56) References Cited

U.S. PATENT DOCUMENTS

| | | | |
|---|---|---|---|
| 2014/0359578 A1 | 12/2014 | Jesse et al. | |
| 2015/0006672 A1* | 1/2015 | Morel | G06Q 30/0269 |
| | | | 709/217 |
| 2015/0127714 A1* | 5/2015 | Ivashyn | H04M 1/72561 |
| | | | 709/203 |
| 2015/0227943 A1* | 8/2015 | Radomsky | G06Q 30/018 |
| | | | 705/317 |
| 2015/0248391 A1* | 9/2015 | Watanabe | G06F 17/243 |
| | | | 715/226 |

OTHER PUBLICATIONS

Lin et al., "Method and System for Scanning Multiple QR Codes," An IP.com Prior Art Database Technical Disclosure, IP.com No. IPCOM000237393D, Jun. 17, 2014 (4 pages).

\* cited by examiner

QR CODE LOADING OF FORM ELEMENTS

BACKGROUND OF THE INVENTION

Field of the Invention

The present invention relates in general to computing systems, and more particularly to, various embodiments for providing facilitating form entry using a variety of computing components.

Description of the Related Art

In today's interconnected and complex society, computers and computer-driven equipment are more commonplace. Processing devices, with the advent and further miniaturization of integrated circuits, have made it possible to be integrated into a wide variety of personal, business, health, home, education, and other devices. Accordingly, the use of computers, network appliances, and similar data processing devices continue to proliferate throughout society.

SUMMARY OF THE INVENTION

Various embodiments for facilitating form entry by one or more processors, are provided. In one embodiment, by way of example only, a method for facilitating form entry, again by one or more processors is provided. The form is initialized by recognizing template data using a Quick Response (QR) code scanned by a user device. The form is populated using user data obtained from the user device.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
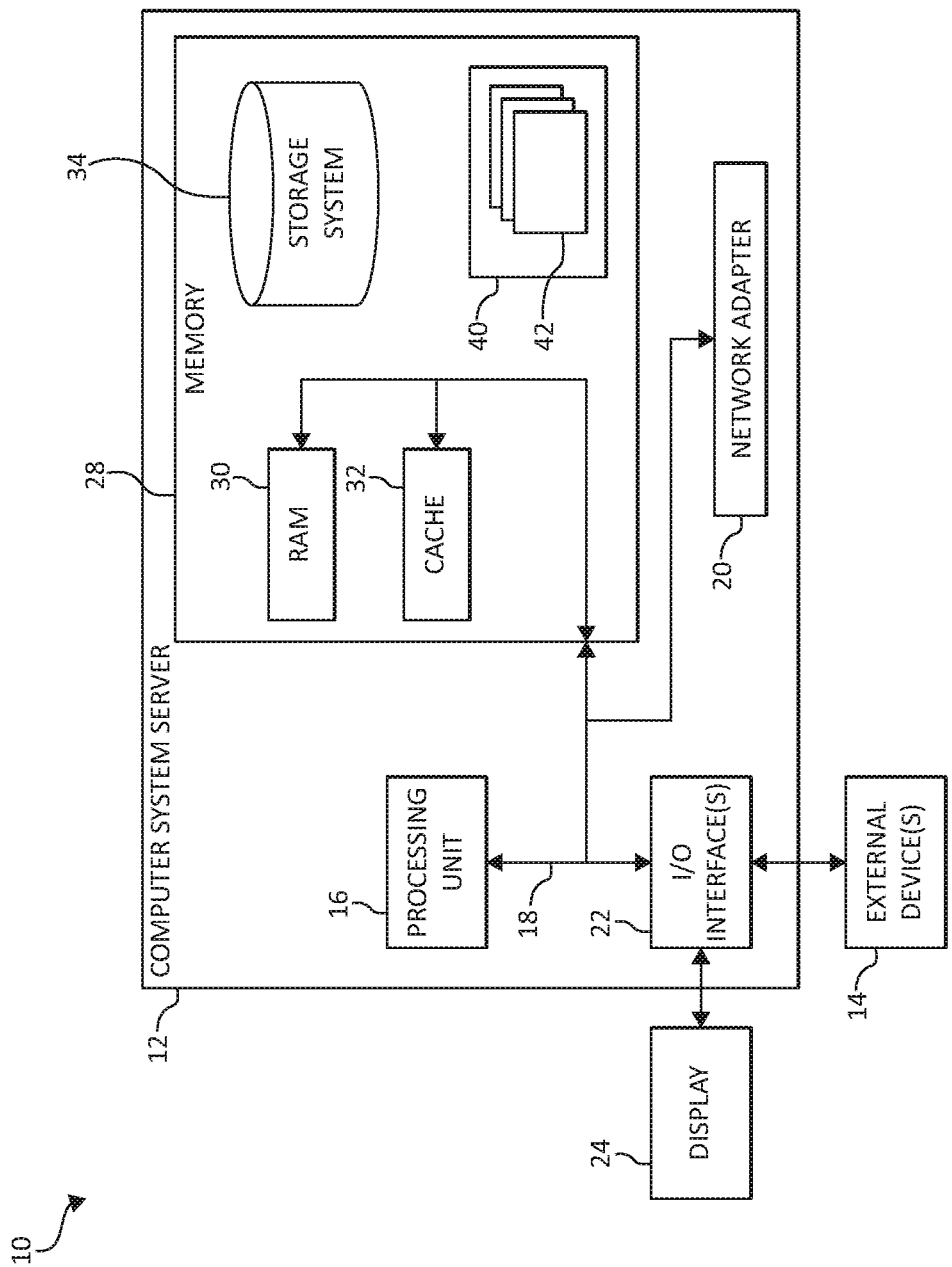
FIG. 1 is a block diagram depicting an exemplary computing node according to an embodiment of the present invention.

Currently, there is no uniform and efficient way to capture and share personal information between end users and service providers. Instead, people are required to manually and repeatedly write personal information on paper forms. It is not uncommon for people to be required to repetitively enter the same basic personal information on any number of forms in day-to-day life. However, the personal information that people use to complete forms is typically found on their user devices (e.g., smartphones, etc.).

To help facilitate form entry, and leverage personal information generally found in digital form on user devices, the mechanisms of the present invention map personal data from user devices (e.g., smartphones, tablets, or other mobile devices) to complete an information request based on the user's security constraints.

In one embodiment, the form format is a generic format (e.g., XML), with fields corresponding to a particular information request. Based on the user-defined privacy controls, an application on the user device may be configured to map user data from other applications to respective request fields. To accomplish this mapping, a QR code may be established for each form element in a particular sheet, corresponding to the appropriate information for use. The application may then generate an additional QR code of the completed, filled form, so that the form may be then shared.

The mechanisms of the illustrated embodiments feature several benefits, including using a standard QR code that allows many different user devices to take advantage of various aspects of the present invention. The mechanisms also allow for the security of information transferred electronically (for example, under encryption protection) versus an insure method of writing potentially sensitive personal information on an insecure paper form.

In addition to the foregoing, the mechanisms of the present invention allow for the potential reduction of human error by pulling information from a structured format that is likely verified on a particular user device. The information itself may also be more accurate, as a result.

Additional aspects of the present invention and attendant benefits will be further described, following.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

In the context of the present invention, and as one of skill in the art will appreciate, various components depicted in FIG. 1 may be located in a moving vehicle. For example, some of the processing and data storage capabilities associated with mechanisms of the illustrated embodiments may take place locally via local processing components, while the same components are connected via a network to remotely located, distributed computing data processing and storage components to accomplish various purposes of the present invention. Again, as will be appreciated by one of ordinary skill in the art, the present illustration is intended to convey only a subset of what may be an entire connected network of distributed computing components that accomplish various inventive aspects collectively.

Figure 2:
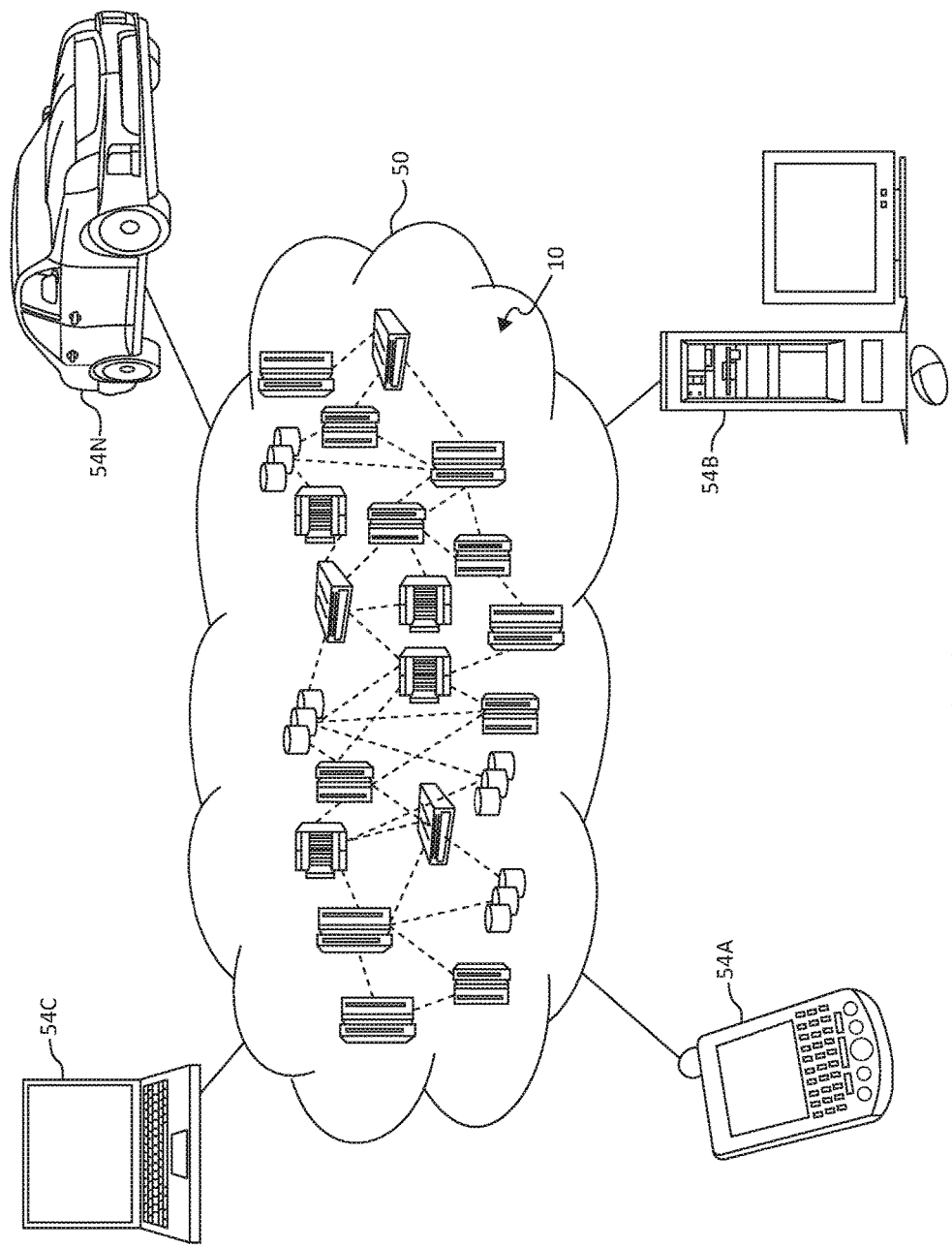
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
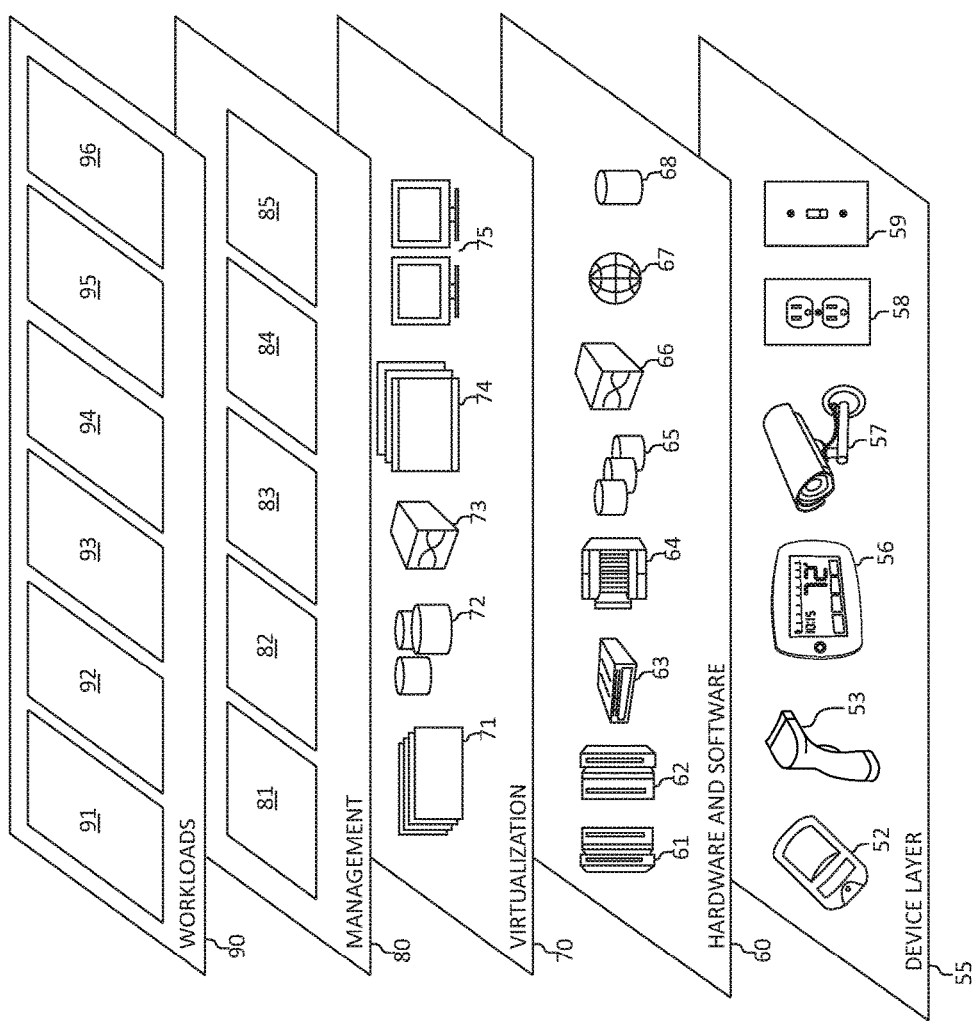
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Device layer 55 includes physical and/or virtual devices, embedded with and/or standalone electronics, sensors, actuators, and other objects to perform various tasks in a cloud computing environment 50. Each of the devices in the device layer 55 incorporates networking capability to other functional abstraction layers such that information obtained from the devices may be provided thereto, and/or information from the other abstraction layers may be provided to the devices. In one embodiment, the various devices inclusive of the device layer 55 may incorporate a network of entities collectively known as the "internet of things" (IoT). Such a network of entities allows for intercommunication, collection, and dissemination of data to accomplish a great variety of purposes, as one of ordinary skill in the art will appreciate.

Device layer 55 as shown includes sensor 52, hand-held scanner 53, "learning" thermostat 56 with integrated processing, sensor, and networking electronics, camera 57, controllable household outlet/receptacle 58, and controllable electrical switch 59 as shown. Other possible devices may include, but are not limited to various additional sensor devices, networking devices, electronics devices (such as a remote control device), additional actuator devices, so called "smart" appliances such as a refrigerator or washer/dryer, and a wide variety of other possible interconnected objects.

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various QR and data import/export workloads and functions 96. In addition, QR workloads and functions 96 may include such operations as data migration (personal information populated into form template fields, for example), data encryption, and/or data storage operations as will be further described. One of ordinary skill in the art will appreciate that the QR and data import/export workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
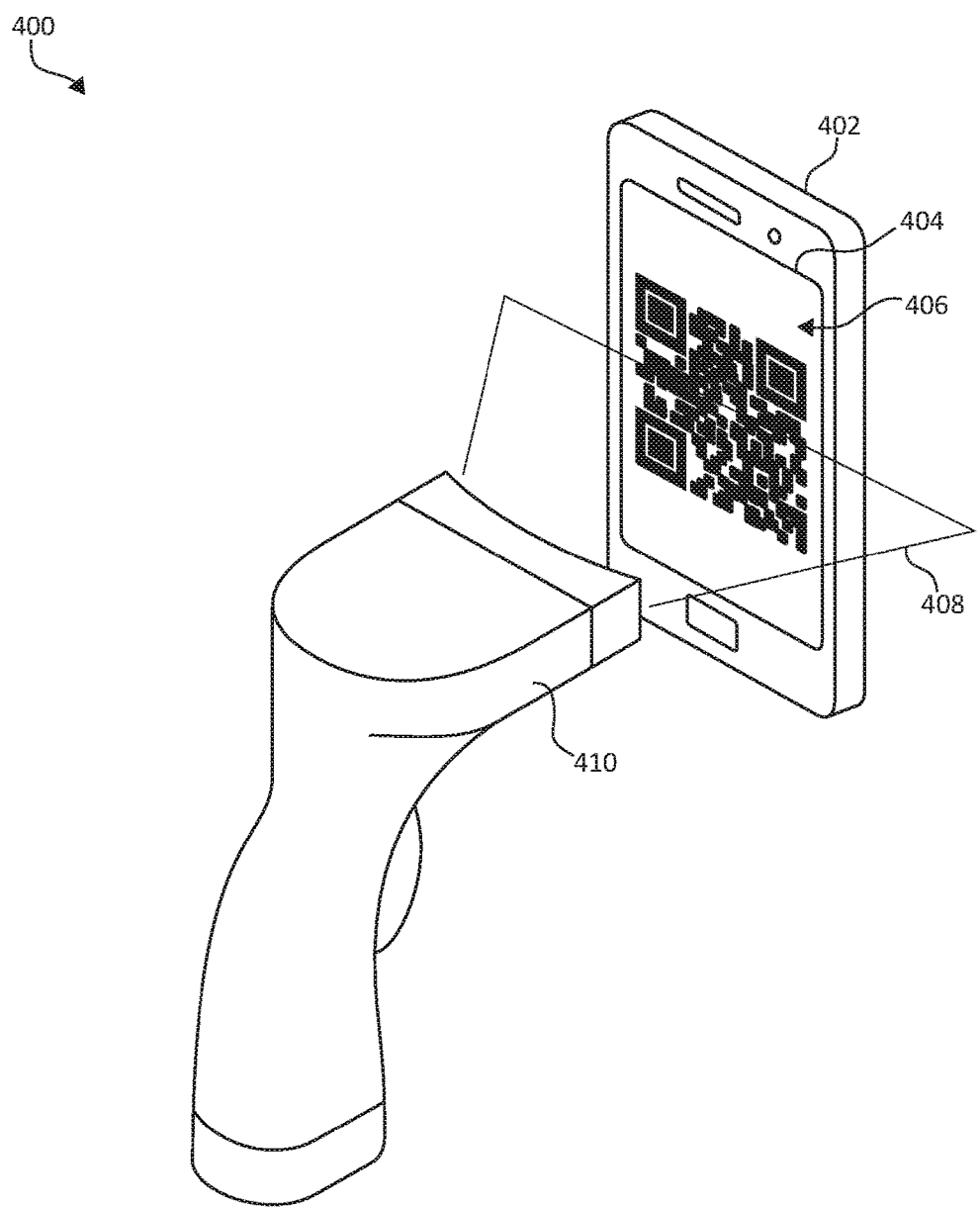
FIG. 4 is an illustration of an exemplary embodiment of the present invention incorporating a Quick Response (QR) code as presented on a user device to a QR scanner.

Turning to FIG. 4, a block diagram of various hardware 400 used in combination with additional aspects of the illustrated embodiments is depicted to accomplish various purposes of the present invention. A user device 402, such as a smartphone, tablet, laptop computer, or other hardware is shown having a display 404. The user device is equipped with hardware such as the processing unit 18, memory (e.g., RAM 30), and other hardware previously depicted in FIG. 1 (as well as appropriate software executing on the hardware) to present QR code information 406 on the display 404 as shown.

A scanner device 410 then reads the QR code information 406 using conventional scanning technology 408. In other embodiments, the QR code information is generated and displayed by a terminal display, such as a computer display. The user device uses an onboard camera to scan the QR code information from the terminal display. One of ordinary skill in the art will appreciate that a wide variety of QR code presentation and scanning embodiments may be implemented to accomplish the QR presentation and scanning functionality necessary to share data between electronic devices.

Figure 5:
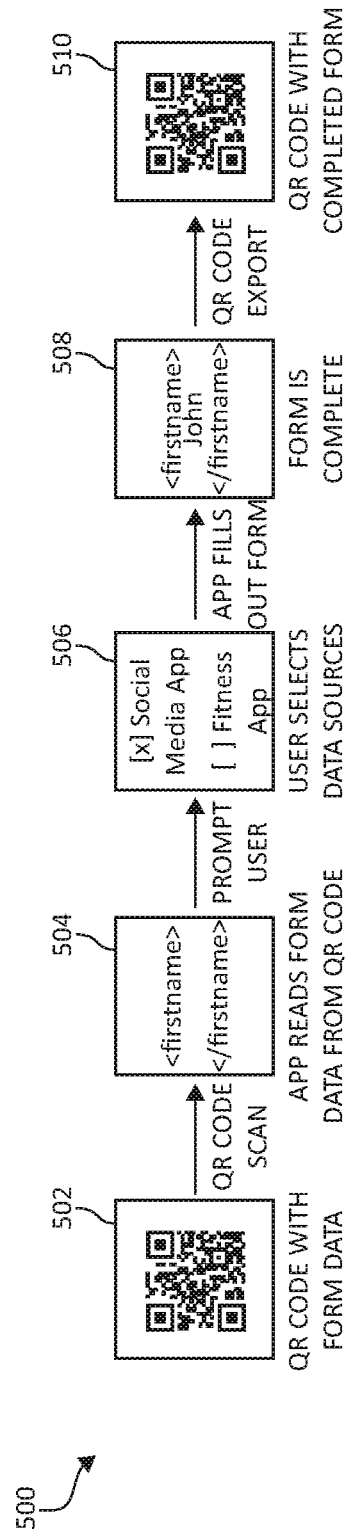
FIG. 5 is an additional block diagram depicting, among other aspects of the present invention, an exemplary process flow of one embodiment of the present invention.

With the foregoing hardware and software previously depicted in FIGS. 1-4 in mind, consider now FIG. 5, which is an additional block/flow diagram of an exemplary process flow for facilitating form entry according to various aspects of the present invention. In a first illustrated step, various template data corresponding to a physical form is converted to a QR code representation (step 502).

In a following step 504, an application on the user device (herein referred to as "QR application") is adapted to interpret the data from the scanned QR code into an intelligible format, such as XML, fields. In the depicted example, the <firstname> </firstname> XML, field is interpreted from a scanned QR code.

The user may then be prompted to select a source for the QR application on the user device to import data to populate the respective form. The QR application may determine a number of possible/available data sources to import the data based on user-defined security settings. For example and as shown in step 506, the user is prompted to select between an available social media application and a fitness application in which to obtain the data for the form.

In a following step 508, the QR application on the user device then populates as many of the template data fields with the data obtained from the selected application. In the depicted embodiment, the user device application has pulled data from the social media application to populate the XML <firstname> </firstname> field with the information "John." To the extent possible, the QR application populates the converted QR template fields with the user information, and if necessary, prompts the user to enter any remaining information.

In one embodiment, to accomplish this data population in the applicable form, the mechanisms of the present invention perform a lexical match of field names from a particular QR code with data fields in the application. Based on a match for the field in the application, the corresponding value is extracted for the field, and the form is populated accordingly. In further embodiments, the mechanisms may match a form element name with a QR code field name, match the value entry and data type from the preexisting application, and then enter the corresponding value in the corresponding field in the form.

When the form is complete, the QR application then converts the filled form into another QR representation in step 510. The QR representation is then displayed on the user device, where the representation can be scanned by the entity making the request for information.

In view of the foregoing description in FIG. 5, consider the following two examples. In a first example, a patient in a hospital waiting room is required to fill out an admissions form. Using the mechanisms of the illustrated embodiments, the hospital can share the form via QR code, and the patient can access the form on their smartphone by scanning the QR code.

Once the patient has the form on their smartphone with the QR application, the QR application may then auto-fill the form based on data from different applications in their smart device. The user can select which apps (e.g. social media, fitness, other applications with personal data) they want to use as data sources. The user is able to control access of their personal information based on which application(s) the data is pulled from and which application(s) the data is provided to. Finally, the QR application generates a QR code of the completed form. This QR code can be scanned by a hospital device (e.g. tablet) and received by hospital staff.

In a second example, at job fairs, recruiters instruct applicants to apply online, which can result in a significant delay in the interview process. Using the mechanisms of the illustrated embodiments, recruiters can share their form via QR code and the applicants can access the form on their smartphone. The form can be filled out as described in the previous example. The applicants can then return the form to the recruiter via QR code. In a further use of functionality, the applicants are able to maintain a profile of their personal information (through use of the QR app using a cloud-based storage location, or another storage mechanism) for other job applications, eliminating the need to re-enter information.

Figure 6:
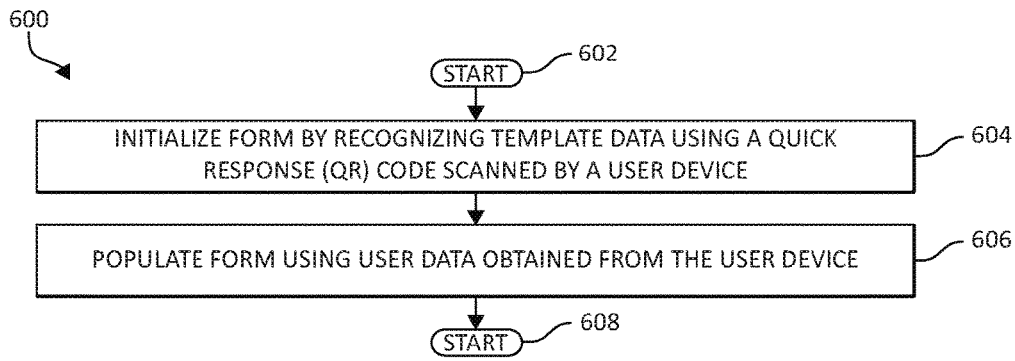
FIG. 6 is a flowchart diagram of an exemplary method for facilitating form entry by one or more processors, in which various aspects of the present invention may be realized.

Turning now to FIG. 6, a flowchart diagram of an exemplary method 600 for facilitating form entry by one or more processors is depicted, in which various aspects of the illustrated embodiments may be realized. Method 600 begins (step 602) by initializing a form by recognizing template data using a Quick Response (QR) code scanned by a user device (step 604). The form is populated using user data obtained from the user device (step 606). The method 600 then ends (step 608).

Figure 7:
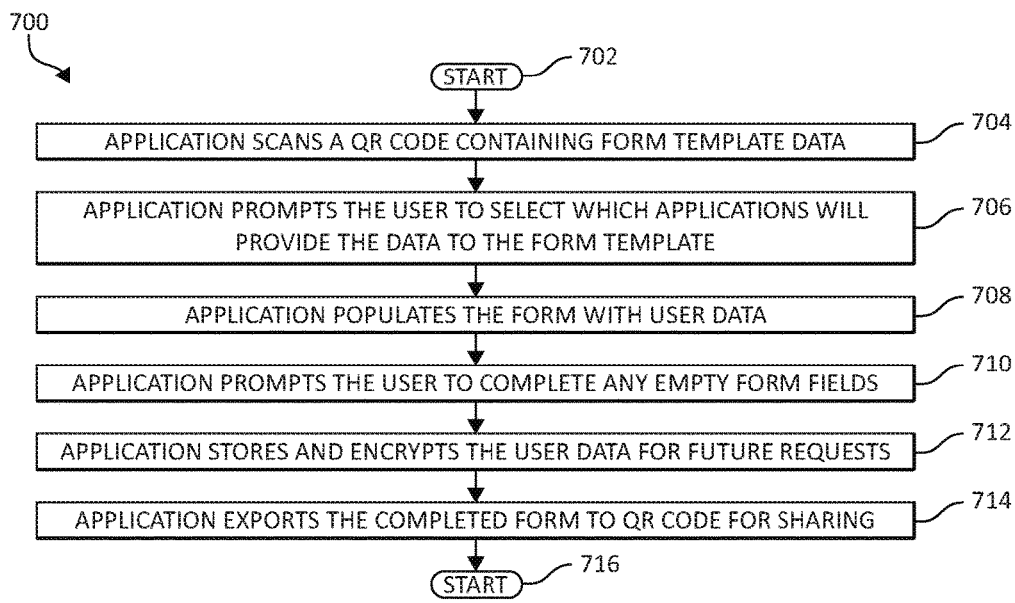
FIG. 7 is an additional flowchart diagram of an additional exemplary method for facilitating form entry by one or more processors, again in which various aspects of the present invention may be realized.

In FIG. 7, following, an additional flowchart diagram of an additional exemplary method 700 for facilitating form entry by one or more processors is depicted, again in which various aspects of the illustrated embodiments may be realized. Method 700 begins (step 702) with the scanning of a QR code containing form template data (step 704). The QR application then prompts the user to select which applications will provide the data to the form template (step 706).

In a following step 708, the QR application then populates the form with user data. If any empty fields remain, the QR application prompts the user for additional data entry (step 710). The QR application then stores and encrypts the user data for future requests (step 712), and the QR application exports the completed form as QR code for sharing (step 714). The method 700 then ends (step 716).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for facilitating form entry by one or more processors, comprising:
   initializing the form by recognizing template data using a Quick Response (QR) code presented on a terminal display and scanned by a user device;
   populating the form using user data obtained from the user device by performing a lexical match of field names of the form from the QR code with data fields retrieved from a preexisting application executing on the user device such that the user device recognizes the field names in the form and populates the form using the user data from the preexisting application upon determining the user data exists in the preexisting application in the data fields where the lexical match is found; wherein, subsequent to the populating, the user device queries user input to enter remaining user data unable to be populated into the form; and
   exporting the populated form as an updated QR code presented on a display of the user device to be shared with an additional device.

2. The method of claim 1, further including accessing the user data by prompting the user to select an available data repository on the user device.

3. The method of claim 2, further including accessing the data repository through the preexisting application executing on the user device.

4. The method of claim 3, further including, pursuant to accessing the data repository from the preexisting application:
   based on the lexical match for at least one of the data fields in the application, extracting a corresponding value for the at least one of the data fields to populate the form.

5. The method of claim 4, further including, pursuant to populating the form:
   matching a form element name with one of the QR code field names,
   matching an entry of the corresponding value and a data type from the application, or
   entering the corresponding value in a form field.

6. The method of claim 1, further including:
   storing the populated form,
   encrypting the user data to be used in a subsequent form entry, or
   transmitting the encrypted user data to a distributed computing environment.

7. A system for facilitating form entry, comprising:
   one or more processors, that:
      initialize the form by recognizing template data using a Quick Response (QR) code presented on a terminal display and scanned by a user device,
      populate the form using user data obtained from the user device by performing a lexical match of field names of the form from the QR code with data fields retrieved from a preexisting application executing on the user device such that the user device recognizes the field names in the form and populates the form using the user data from the preexisting application upon determining the user data exists in the preexisting application in the data fields where the lexical match is found; wherein, subsequent to the populating, the user device queries user input to enter remaining user data unable to be populated into the form, and
      export the populated form as an updated QR code presented on a display of the user device to be shared with an additional device.

8. The system of claim 7, wherein the one or more processors access the user data by prompting the user to select an available data repository on the user device.

9. The system of claim 8, wherein the one or more processors access the data repository through the preexisting application executing on the user device.

10. The system of claim 9, wherein the one or more processors, pursuant to accessing the data repository from the preexisting application:
   based on the lexical match for at least one of the data fields in the application, extract a corresponding value for the at least one of the data fields to populate the form.

11. The system of claim 10, wherein the one or more processors, pursuant to populating the form:
   match a form element name with one of the QR code field names,
   match an entry of the corresponding value and a data type from the application, or
   enter the corresponding value in a form field.

12. The system of claim 7, wherein the one or more processors:
   store the populated form,
   encrypt the user data to be used in a subsequent form entry, or
   transmit the encrypted user data to a distributed computing environment.

13. A computer program product for facilitating form entry by one or more processors, the computer program product comprising a non-transitory computer-readable storage medium having computer-readable program code portions stored therein, the computer-readable program code portions comprising:
   an executable portion that initializes the form by recognizing template data using a Quick Response (QR) code presented on a terminal display and scanned by a user device;
   an executable portion that populates the form using user data obtained from the user device by performing a lexical match of field names of the form from the QR code with data fields retrieved from a preexisting application executing on the user device such that the user device recognizes the field names in the form and populates the form using the user data from the preexisting application upon determining the user data exists in the preexisting application in the data fields where the lexical match is found; wherein, subsequent to the populating, the user device queries user input to enter remaining user data unable to be populated into the form; and an executable portion that exports the populated form as an updated QR code presented on a display of the user device to be shared with an additional device.

14. The computer program product of claim 13, further including an executable portion that accesses the user data by prompting the user to select an available data repository on the user device.

15. The computer program product of claim 14, further including an executable portion that accesses the data repository through the preexisting application executing on the user device.

16. The computer program product of claim 15, further including an executable portion that, pursuant to accessing the data repository from the preexisting application: based on the lexical match for at least one of the data fields in the application, extracts a corresponding value for the at least one of the data fields to populate the form.

17. The computer program product of claim 16, further including an executable portion that, pursuant to populating the form:
matches a form element name with one of the QR code field names,
matches an entry of the corresponding value and a data type from the application, or
enters the corresponding value in a form field.

18. The computer program product of claim 13, further including an executable portion that:
stores the populated form,
encrypts the user data to be used in a subsequent form entry, or
transmits the encrypted user data to a distributed computing environment.

* * * * *